United States Patent
Guyot

(10) Patent No.: US 10,745,311 B2
(45) Date of Patent: Aug. 18, 2020

(54) METHOD OF FABRICATING A GLASS CONTAINER, AND A CORRESPONDING INSTALLATION FOR PERFORMING THE METHOD

(71) Applicant: VERESCENCE FRANCE, Puteaux (FR)

(72) Inventor: Laurent Pierre Marie Guyot, Escaudoeuvres (FR)

(73) Assignee: VERESCENCE FRANCE, Puteaux (FR)

(*) Notice: Subject to any disclaimer, the term of this patent is extended or adjusted under 35 U.S.C. 154(b) by 176 days.

(21) Appl. No.: 15/916,707

(22) Filed: Mar. 9, 2018

(65) Prior Publication Data
US 2018/0257968 A1    Sep. 13, 2018

(30) Foreign Application Priority Data
Mar. 10, 2017   (FR) ...................... 17 51982

(51) Int. Cl.
*C03B 9/335*        (2006.01)
*C03B 9/32*         (2006.01)
(Continued)

(52) U.S. Cl.
CPC ............... *C03B 9/335* (2013.01); *C03B 9/32* (2013.01); *C03B 9/344* (2013.01); *C03B 9/369* (2013.01); *C03B 9/3663* (2013.01); *C03B 9/3841* (2013.01)

(58) Field of Classification Search
CPC ....... C03B 9/344; C03B 9/3663; C03B 9/369; C03B 9/3841
See application file for complete search history.

(56) References Cited

U.S. PATENT DOCUMENTS

| 1,230,368 | A | 6/1917 | Barber, Jr. |
| 9,670,085 | B2 | 6/2017 | Bruneau et al. |
| 2019/0218129 | A1* | 7/2019 | Sasaki ............... B65D 85/48 |

FOREIGN PATENT DOCUMENTS

| FR | 397261 | 12/1908 |
| WO | 2014044669 A1 | 3/2014 |

OTHER PUBLICATIONS

FR397261 EPO Machine Translation, Performed Jan. 9, 2020. (Year: 2020).*

(Continued)

*Primary Examiner* — Lisa L Herring
(74) *Attorney, Agent, or Firm* — McClure, Qualey & Rodack, LLP

(57) ABSTRACT

The invention relates to a method of fabricating a glass container, the method comprising a forming step of forming molten glass in order to obtain a semi-finished container (4) comprising a shell (5) presenting inside and outside faces (7, 8), a cooling step during which the semi-finished container is in a transient state in which the glass forming the outside face is sufficiently viscous for it not to deform under the effect of gravity, while the glass forming the inside face is sufficiently fluid to allow the inside face to deform under the effect of gravity, the method including a shaping operation while the semi-finished container is in the transient state, in which operation the semi-finished container is maintained for a predetermined time in a position that is inclined relative to its upright vertical position in order to modify the shape of the inside face under the effect of gravity.

14 Claims, 2 Drawing Sheets

(51) Int. Cl.
*C03B 9/34* (2006.01)
*C03B 9/36* (2006.01)
*C03B 9/38* (2006.01)

(56) References Cited

OTHER PUBLICATIONS

French search report dated Nov. 22, 2017 in FR application (No. 1751982).

* cited by examiner

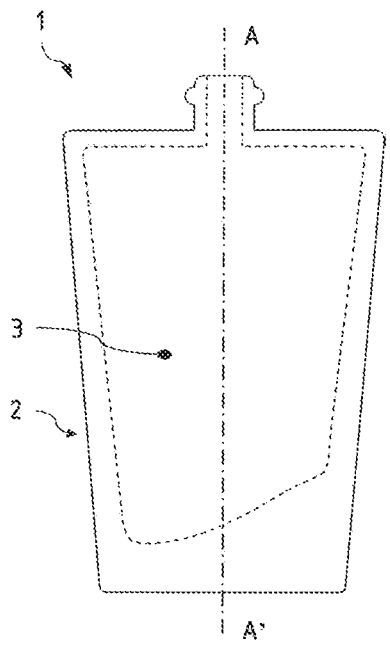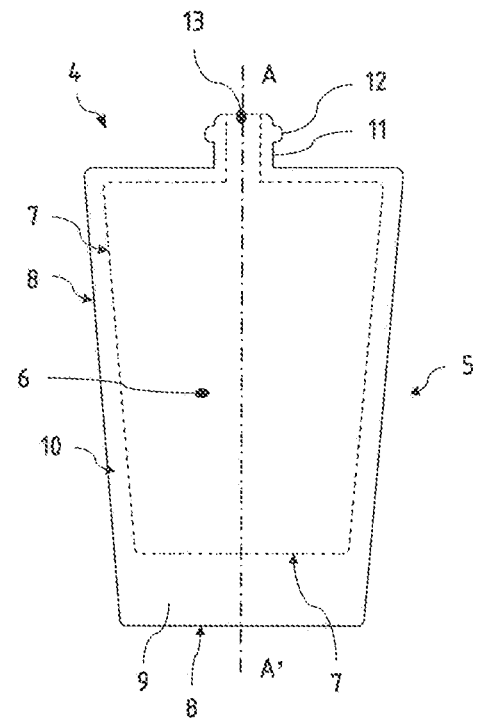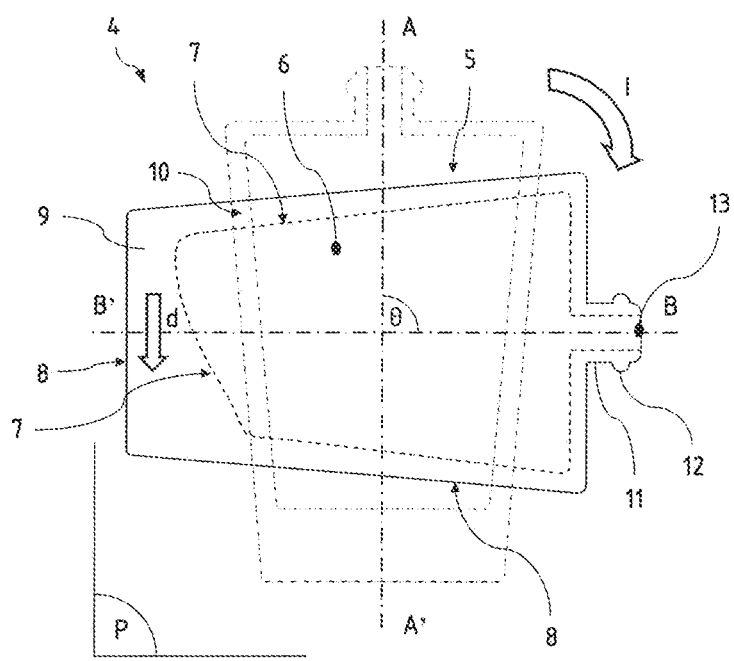

US 10,745,311 B2

METHOD OF FABRICATING A GLASS CONTAINER, AND A CORRESPONDING INSTALLATION FOR PERFORMING THE METHOD

The present invention relates to the general field of methods of fabricating glass containers. The invention also relates to the technical field of fabrication installations designed to perform such methods.

More precisely, the invention relates to a method of fabricating a glass container from a mass of molten glass, the method comprising a forming step for forming said mass of molten glass in order to obtain a semi-finished container comprising a glass shell that defines an inside cavity and that presents an inside face placed facing said inside cavity and an opposite, outside face.

The invention also relates to an installation for fabricating a glass container from a mass of molten glass, the installation comprising a forming station for forming said mass of molten glass in order to obtain a semi-finished container comprising a glass shell defining an inside cavity and presenting an inside face placed facing said inside cavity and an opposite, outside face.

In the field of methods of fabricating glass containers, it is known to have recourse to a step of forming a mass of molten glass, e.g. by pressing or blowing said mass of molten glass ("paraison" or gob), in order to obtain a semi-finished container comprising a glass shell defining an inside cavity and presenting an inside face arranged facing said inside cavity and an opposite, outside face. Such a semi-finished container prefigures the container that will finally be obtained after cooling said semi-finished container to a temperature at which all of the glass that constitutes it takes on a solid state, in which it is "frozen" and not deformable.

Methods are also known during which a particular shape is imparted to said inside face, e.g. using a forming punch carrying on its surface a specific pattern or shape in relief, or indeed by using a nozzle for injecting gas under pressure, which nozzle is inserted into said inside cavity and discharges into the proximity of said inside face in order to deform it locally while the glass constituting it is still sufficiently malleable.

As a result, it is possible in particular to obtain glass containers in which the thickness of the side wall and/or of the bottom is not constant, in particular because of a non-uniform three-dimensional distribution of the glass. Such methods are used in particular for fabricating containers that are to contain cosmetic substances or perfume, in particular to give said containers a distinctive and pleasing visual appearance, and in order to showcase their content.

Although such methods and the installations for performing them generally give satisfaction, they nevertheless suffer from certain drawbacks.

Specifically, the use of a forming punch is generally possible only with glass containers having a large ring, such as jars, and it is difficult or impossible to use when fabricating glass containers having a narrow ring, such as bottles or flasks.

Although a nozzle for injecting gas under pressure is suitable for use in glass containers having a narrow ring, that nevertheless requires the use of potentially expensive special techniques and may require time-consuming adjustments that naturally increase considerably both the costs and the durations of production.

The objects assigned to the invention consequently seek to remedy the above-described drawbacks and to propose a novel method that makes it possible in simple and inexpensive manner to fabricate a glass container presenting a very distinctive and pleasing visual appearance, and also a novel installation dedicated to performing the novel method.

The invention also seeks to propose a novel method of fabricating glass containers and an associated novel installation making high production rates possible.

The objects given to the invention are achieved by a method of fabricating a glass container from a mass of molten glass, the method comprising a forming step for forming said mass of molten glass in order to obtain a semi-finished container comprising a glass shell that defines an inside cavity and that presents an inside face placed facing said inside cavity and an opposite, outside face, the method being characterized in that it comprises a cooling step for cooling the semi-finished container, during which said semi-finished container is taken to a transient state in which the glass forming said outside face is sufficiently viscous for said outside face not to deform perceptibly under the effect of gravity, while the glass forming said inside face is still sufficiently fluid to be capable, on the contrary, of allowing said inside face to deform under the effect of gravity, and in that it includes a shaping operation for shaping said inside face while the semi-finished container is in said transient state, during which operation the semi-finished container is maintained for a predetermined time in an inclined position that is inclined relative to its upright vertical position so as to cause the shape of said inside face to be modified by movement of the glass under the effect of gravity.

The objects given to the invention are also achieved by an installation for fabricating a glass container from a mass of molten glass, the installation comprising a forming station for forming said mass of molten glass in order to obtain a semi-finished container comprising a glass shell defining an inside cavity and presenting an inside face placed facing said inside cavity and an opposite, outside face, the installation being characterized in that it comprises cooling means suitable for taking said semi-finished container to a transient state in which the glass forming said outside face is sufficiently viscous for said outside face not to deform perceptibly under the effect of gravity, while the glass forming said inside face is still sufficiently fluid to be capable, on the contrary, of allowing said inside face to deform under the effect of gravity, and in that it comprises shaper means for shaping said inside face, which means are designed to maintain for a predetermined time said semi-finished container in an inclined position that is inclined relative to its upright vertical position so as to cause the shape of said inside face to be modified by movement of the glass under the effect of gravity while the semi-finished container is in said transient state.

Other objects and advantages of the invention appear better on reading the following description and from the accompanying figures, which are provided purely by way of non-limiting explanation, and in which:

FIG. 1 is a diagrammatic vertical section view showing a first variant of a glass container obtained at the end of the method of the invention;

FIG. 2 is a diagrammatic vertical section view showing a first variant embodiment of a semi-finished glass container (prior to any operation of shaping its inside face) from which it is possible to obtain the FIG. 1 container in the method of the invention;

FIG. 3 is a diagrammatic vertical section view showing a preferred implementation of the method of the invention, making it possible to obtain the FIG. 1 glass container from the FIG. 2 semi-finished container by maintaining the semi-finished container for a predetermined time in a position in which it is inclined at 90° relative to its upright vertical position;

Figure 4:
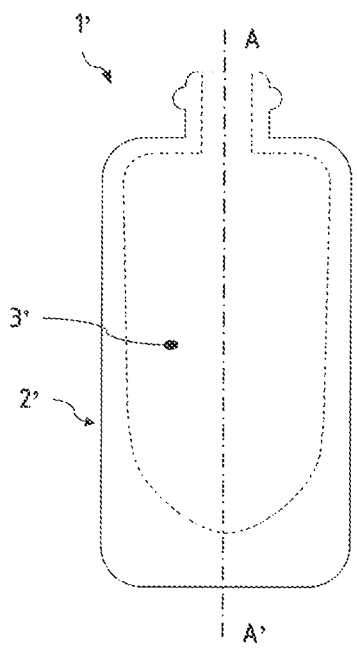
FIG. 4 is a diagrammatic vertical section view showing a second variant of a glass container obtained by the method of the invention.
Figure 5:
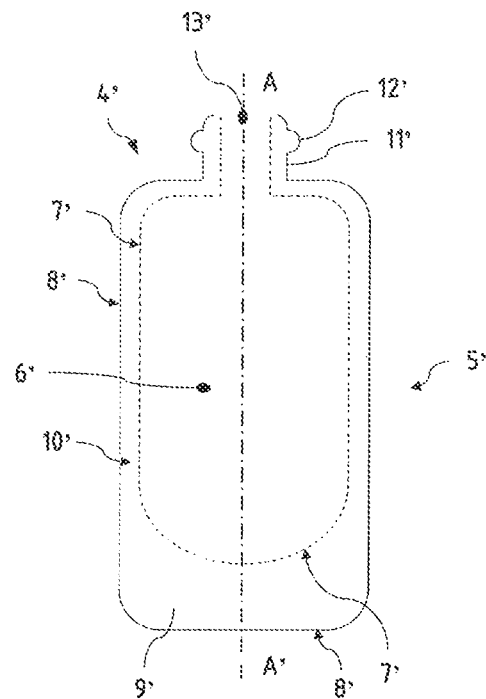
Figure 6:
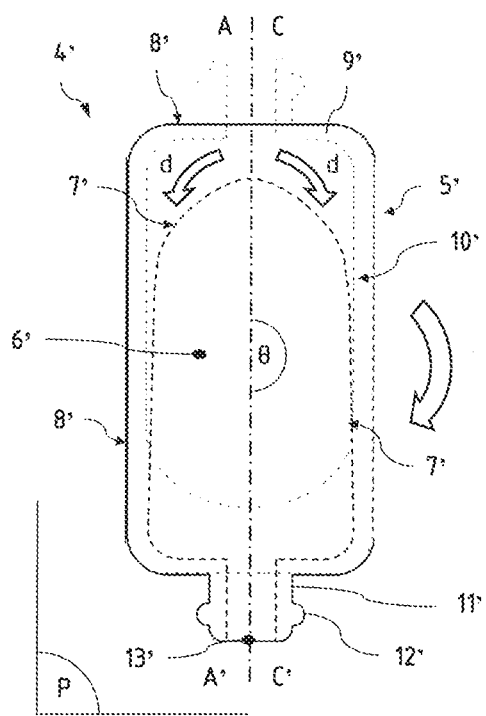

FIG. 5 is a diagrammatic vertical section view showing a second variant embodiment of a semi-finished glass container (prior to an operation of shaping its inside face) from which it is possible to obtain the FIG. 4 container by the method of the invention; and FIG. 6 is a diagrammatic vertical section view showing another preferred implementation of the method of the invention enabling the FIG. 4 glass container to be obtained from the FIG. 5 semi-finished container by maintaining the semi-finished container for a predetermined time in a position that is inclined by 180° relative to its upright vertical position.

In a first aspect, the invention provides a method of fabricating a glass container 1, 1', i.e. a hollow article made of glass, and FIGS. 1 and 4 are diagrams showing two embodiments thereof.

Preferably, the method of the invention is an automatic industrial method, advantageously performed using automatic production means of the individual section (IS) machine type, so as to ensure production at an industrial rate. Thus, the method of the invention is preferably not applied to a context of manual or semiautomatic fabrication of said glass container 1, 1', even though it is entirely possible for it to be performed in such a context.

As shown, said glass container 1, 1' preferably comprises a glass shell 2, 2' that defines a cavity 3, 3' for receiving a substance that is "fluid", i.e. a substance that can flow, e.g. a substance that is liquid, pasty (such as a liquid having a high degree of viscosity), or a powder. Preferably, the container 1, 1' obtained using the method of the invention forms a container that is designed to contain a "fluid" substance for cosmetic use (perfume, cream, talc, etc.) or for food purposes (oil, vinegar, water, juice, wine or spirits, etc.). Naturally, said container 1, 1' could also be intended for some other use, e.g. for containing a pharmaceutical substance, ink for writing or drawing, or indeed for forming a vase (e.g. of the single-flower type).

In the invention, the method of fabricating such glass container 1, 1' from a mass of molten glass comprises a step of forming said mass of molten glass, i.e. advantageously a step of mechanical forming while hot, in order to obtain a semi-finished container 4, 4'.

In the context of the invention, the term "semi-finished container" is preferably used to designate an intermediate hollow glass article prefiguring said container 1, 1', which in turn can be referred to as "finished". As shown in FIGS. 2 and 5, said semi-finished container 4, 4', like the container 1, 1' that it is to become the end of the method of the invention, advantageously comprises a glass shell 5, 5' defining an inside cavity 6, 6' and presenting an inside face 7, 7' arranged facing said inside cavity 6, 6', and an opposite, outside face 8, 8'.

In particular, although the semi-finished container 4, 4' preferably presents an outside face 8, 8' of shape substantially identical to the shape that is to be had by the corresponding outside face of the finished container 1, 1', said semi-finished container 4, 4', advantageously differs from said finished container 1, 1' in that the shape of its inside face 7, 7' is not final at the end of said forming step, but on the contrary is temporary, as can be understood from reading what follows.

It should be observed that in the context of the invention, the term "glass" is preferably employed in its conventional sense, i.e. to designate a mineral glass, preferably obtained from silica. In this context, said glass may for example be a white silicate glass, that is transparent, such as a lime-soda glass, a borosilicate glass, or indeed a "crystal" glass (glass based on silica and lead oxide). With this assumption, the mass of molten glass in question may be obtained by any means known in the glass-making industry. Nevertheless, said glass could alternatively be a so-called "organic" glass, obtained from a synthetic resin, such as for example non-expanded polystyrene (PS), polymethyl methylacrylate (PMMA), or indeed polycarbonate (PC).

The shell 5, 5' of the semi-finished container 4, 4' is advantageously made up of a glass bottom 9, 9' and glass side wall 10, 10', which side wall 10, 10' rises from the periphery of said bottom 9, 9', preferably up to a neck 11, 11' and a ring 12, 12' that close said semi-finished container 4, 4' while leaving a more or less large opening 13, 13' enabling the inside cavity 6, 6' to be put into communication with the outside. It can thus be understood that the inside face 7, 7' of the shell 5, 5' of the semi-finished container 4, 4' preferably corresponds essentially to the respective inside faces of said bottom 9, 9' and of said side wall 10, 10' that are arranged facing said inside cavity 6, 6', while the outside face 8, 8' of the shell 5, 5' preferably corresponds essentially, in corresponding manner, to the respective outside faces of said bottom 9, 9' and of said side wall 10, 10'.

The general shape of the shell 5, 5' of said semi-finished container 4, 4', and indeed that of said finished container 1, 1', is naturally not restricted to the shapes shown in the figures, and by way of example it could be a body of revolution (spherical, ovoid, cylindrical, frustoconical, etc.) or otherwise (cube-shaped, pyramid-shaped, etc.), whether geometrical or otherwise. Said semi-finished container 4, 4' preferably has a neck 11, 11' and a ring 12, 12' that are narrow, such that the dimensions of said opening 13, 13' are significantly smaller than the dimensions of said inside cavity 6, 6' to which said opening 13, 13' gives access. Thus, said semi-finished container 4, 4' preferably, but in non-limiting manner, prefigures a finished container 1, 1' of flask, vial, or bottle type.

The glass forming said mass of molten glass from which said semi-finished container 4, 4' is obtained is preferably transparent and colorless, however it could alternatively be colored and/or made opaque, e.g. by using metal oxides, so as to end up giving the container 1, 1' a particular appearance characteristic, or indeed so as to protect the fluid substance contained within the container 1, 1' from the effects of light, in particular in certain wavelength ranges. Furthermore, the glass could be "new" glass, i.e. glass obtained exclusively from new raw materials, or alternatively it could be glass that is at least partially recycled, i.e. glass obtained from a non-negligible or even a predominant content of used glass (e.g. in the form of industrial cullet and/or of household cullet).

Preferably, said forming step includes a final blowing operation in a finish mold that is applied to a glass blank obtained from said mass of molten glass, in order to obtain said semi-finished container 4, 4'. The final blowing operation may advantageously be preceded by a preforming operation is order to obtain said blank in a paraison mold, by pressing ("press-and-blow" method) or by blowing ("blow-blow" method) said mass of molten glass. Alternatively, said forming step may comprise only a single pressing operation ("pure press" method) on said mass of molten glass in a paraison mold in order to obtain a blank that directly forms said semi-finished container 4, 4', i.e. in particular without any additional blowing operation. Such final blowing and/or pressing and preforming operations are well known as such in the field of the glass-making industry, and they are therefore not described in greater detail herein.

Once said blank has been placed in the finish mold, it is then allowed to lengthen for a certain length of time under the effect of its own weight prior to blowing it during said final blowing operation in order to form said semi-finished container 4, 4'. On its inside wall, said finish mold may optionally present a negative shape and/or a particular surface appearance (e.g. a pattern in relief), so as to impart a specific shape to the outside face 8, 8' of the semi-finished container 4, 4' by transferring said negative shape or said pattern.

The method of the invention also has a step of cooling the semi-finished container 4, 4' obtained from the forming step. During this cooling step, said semi-finished container 4, 4' is taken to a transient state in which the glass forming the outside face 8, 8' of said semi-finished container 4, 4' is sufficiently viscous, or pasty, to ensure that said outside face 8, 8' does not deform perceptibly under the effect of gravity, while the glass forming the inside face 7, 7' of said semi-finished container 4, 4' is still sufficiently fluid, i.e. presents viscosity that is still sufficiently low, to make it possible, on the contrary, to deform said inside face 7, 7' under the effect of gravity, i.e. under the effect of its own weight.

This deformable or non-deformable nature of said inside and outside faces 7, 7' and 8, 8' under the effect of gravity (said gravity being considered herein as being the main component of the weight force) is preferably determined in the context of the invention by the naked eye and over a time scale that has a direct relationship with the total duration of producing the container 1, 1' (e.g. of the order of about ten seconds), advantageously measured from starting said forming step and until the container 1, 1' is obtained at the end of said cooling step. It should also be observed that said deformable nature, in the meaning of the invention, is advantageously assessed quite independently of any deformation that might be due purely to effects of expansion or contraction of the glass in question during said method.

Thus, reaching said transient state can easily be identified, e.g. by visually observing the behavior of the semi-finished container over a sufficient length of time, and by observing in particular the existence of a flow towards the ground of the mass of glass forming the inside face 7, 7' of the semi-finished container 4, 4', while the semi-finished container 4, 4' is held stationary (vertically or inclined) and, on the contrary, no significant flow towards the ground of the mass of glass forming the outside face 8, 8' of said semi-finished container 4, 4' over the time period under consideration.

Preferably, in said transient state, the viscosity of the glass forming the outside face 8, 8' of the semi-finished container 4, 4' is greater than $10^{7.6}$ decipascal-seconds (dPa·s), while the viscosity of the glass forming its inside face 7, 7' is less than or equal to $10^{7.6}$ dPa·s. Specifically, this particular viscosity value (or "Littleton softening point"), which can vary depending on the nature of the glass in question, is generally considered in practice as marking the transition of the glass from a malleable state to a substantially frozen state. Under the above-mentioned circumstances where the glass is not a mineral glass, such as a silica glass, but rather a so-called "organic" glass, the viscosity of said glass in the transient state may naturally differ from that mentioned above, depending on the exact nature of the organic glass in question.

It can be difficult to measure the viscosity of glass in the context of an in-line industrial fabrication method, so in order to identify said transient state, reference may advantageously be made to measuring the respective temperatures Te and Ti of said outside (external) and inside faces 8, 8' and 7, 7' of the semi-finished container 4, 4'. Thus, in said transient state, the temperature Te of said outside face 8, 8' is advantageously lower than the softening temperature $T_L$ (or "Littleton softening point") of the glass in question, while the temperature Ti of said inside face 7, 7' is advantageously higher than or equal to said softening temperature $T_L$. It should be recalled that for a given glass, said softening temperature $T_L$ can advantageously be determined using the fiber elongation method as described in the JIS-R 3104 and ASTM-C338.6 standards.

Preferably, when said mass of molten glass is obtained from a conventional lime-soda glass, which is colorless and transparent, the temperature Te of said outside face 8, 8' in said transient state may typically lie in the range 550° C. to 650° C., while the temperature Ti of said inside face 7, 7' may lie typically in the range 750° C. to 1200° C. Naturally, these temperature ranges are given solely by way of example, it being understood that they vary depending on the nature of the glass used.

Said cooling step advantageously begins while said forming operation is still taking place. Specifically, on contact with the finish mold as mentioned above, the glass forming the outside face 8, 8' of the semi-finished container 4, 4' cools more quickly than the glass forming the inside face 7, 7' of said semi-finished container 4, 4', insofar as the inside wall of the finish mold is generally at a temperature lower than the temperature of the outside face 8, 8' of the semi-finished container 4, 4'. This sets up a viscosity (and temperature) gradient across the thickness of the shell 5, 5' of the semi-finished container 4, 4'. It has also been observed that this gradient becomes particularly steep locally when the mean thickness of said shell 5, 5' at the point under consideration is large, e.g. in the bottom 9, 9' of the semi-finished container 4, 4'. Such a phenomenon can also be observed when the semi-finished container 4, 4' is obtained using a single pressing operation (the "pure press" method), with the glass forming the outside face 8, 8' of the semi-finished container 4, 4' then potentially beginning to cool on coming into contact with said paraison mold.

Under all circumstances, said transient state advantageously disappears as the semi-finished container 4, 4' cools and said viscosity and temperature gradient tends to level off. In other words, the end of said transient state is advantageously marked by the glass forming said inside and outside faces 7, 7' and 8, 8' respectively having viscosity that is substantially greater than $10^{7.6}$ dPa·s, i.e. at corresponding temperatures Ti and Te that are substantially lower than said softening temperature $T_L$ of the glass in question.

Advantageously taking advantage of this transient phenomenon, the method of the invention comprises a shaping operation while the semi-finished container 4, 4' is in said transient state, i.e. said still-soft inside face 7, 7' is advantageously "remodelled". This shaping operation advantageously does not affect the shape specifically of said opposite outside face 8, 8', since its glass is sufficiently hard and frozen, given the above.

Advantageously, such modification of said inside face 7, 7' is obtained in the invention by maintaining the semi-finished container 4, 4' in a (preferably predefined) inclined position I during said shaping operation and for a predetermined time t, in which it is inclined relative to its upstanding vertical position in order to give rise to a change in the shape of said inside face 7, 7' by movement d, or creep, of the glass forming said inside face 7, 7' under the effect of gravity.

In the meaning of the invention, said "upright vertical position" advantageously corresponds to the usual, natural position that said semi-finished container 4, 4' (and advantageously the corresponding finished container 1, 1') would take up when standing in stable manner via its bottom 9, 9' on a plane horizontal support. Returning to the examples shown in the figures, said "upright vertical position" preferably corresponds to a position in which the semi-finished container 4, 4' (and advantageously the corresponding finished container 1, 1') extends along a first mean vertical extension axis A-A' that is substantially parallel to the gravity direction (as given for example by a plumb wire). In this "upright vertical position", the neck 11, 11' and the ring 12, 12' thus preferably point upwards, although they might optionally be offset to one side or the other of said first axis A-A', while the bottom 9, 9' points downwards (i.e. towards the ground).

Preferably, during said shaping operation, the shape of the inside face 7, 7' of the semi-finished container 4, 4' by movement d of the glass is modified solely under the effect of gravity, i.e. solely under the effect of the weight specifically of the glass forming said inside face 7, 7'. The method of the invention is thus particularly simple and does not require the use of any complex additional technical means. Alternatively, it is nevertheless possible to envisage that the movement d of the glass could be controlled (i.e. facilitated, accelerated, or on the contrary limited, braked), in particular by applying an additional force in the same direction or in the opposite direction, e.g. by evacuating or centrifuging said semi-finished container 4, 4'.

In a first preferred variant, shown in FIG. 3, said inclined position may correspond to the semi-finished container 4 being inclined I at an angle θ of 90° relative to said upright vertical position. Thus, the semi-finished container 4 is advantageously held in a position in which it extends longitudinally along a second mean axis B-B' forming an angle of 90° relative to said first mean axis A-A' in which it extends vertically (FIG. 3). In other words, said semi-finished container 4 is held in a substantially "prone" position relative to its upright vertical position.

As a result, and as shown in FIG. 3, it can be possible for example to shape said inside face 7, 7' in order to obtain a semi-finished container 4 in which, in particular, the portion of the shell 5 forming the bottom presents thickness that is not uniform and that generally increases in a direction that is advantageously normal to the mean axis A-A' of vertical extension (FIG. 1). It is thus possible, at the end of the cooling step, deliberately to obtain a finished container 1 that has a bottom that is "shifted" or "offset", that is asymmetrical relative to the mean axis A-A' of vertical extension, thus giving the container 1 a particular appearance.

In a second preferred variant, as shown in FIG. 6, said inclined position may correspond to the semi-finished container 4' at an angle θ of inclination I of 180° relative to said upright vertical position. Thus, the semi-finished container 4' is advantageously maintained in a position in which it extends vertically along a third mean axis C-C' forming an angle of 180° with said first mean axis A-A' of vertical extension (FIG. 3), said first and third mean axes A-A' and C-C' thus being parallel, and possibly colinear and coinciding. In other words, said semi-finished container 4' is then advantageously maintained in a position that is completely "upside-down" relative to its upright vertical position.

This specific inclined position turns out to be particularly advantageous when it is desired, by way of example, to fabricate a finished container 1' having an inside bottom that is very rounded, being concave and possibly hemispherical (see FIG. 4) without any undesirable effect of flattening the inside face at the bottom. Specifically, during said shaping operation, the movement d of the glass forming the inside face 7' of the semi-finished container 4, 4' under the effect of gravity tends to accentuate the radius of curvature of said inside face 7' at the bottom 9', with the glass advantageously "flowing" along the side wall 10' towards the neck 11' and the opening 13', as shown diagrammatically in FIG. 6.

Although, as shown in FIGS. 1 and 4, the influence of being held in an inclined position in accordance with the method of the invention is particularly noticeable for a semi-finished container 4, 4' having a bottom that is thick (i.e. the shell 5, 5' has a mean thickness in the bottom 9, 9' that is advantageously greater than or equal to 5 mm), it should be observed that it is thus also possible to modify the shape of the inside face 7, 7' in the side wall 10, 10' and to deliberately introduce particular variation that is more or less pronounced in the mean thickness thereof.

Naturally, these two variants of the inclined position are given herein merely as examples, and more generally it is possible to envisage an angle θ of inclination such that $0°>θ≥180°$, e.g. an angle θ equal to 45°.

For reasons of simplicity, said inclined position is specified above as an inclination I at a positive angle θ (in the clockwise direction), in a plane P containing the axis marking the upright vertical position of said semi-finished container 4, 4', specifically said first axis A-A' (FIGS. 4 and 6). Nevertheless, it should be understood that, without going thereby beyond the ambit of the invention, said inclined position could correspond to an angle θ that is negative ($-180°≤θ<0$) in said plane P, it naturally being possible for the angle of inclination I to be maintained on one side or other of the axis marking said upright vertical position of said semi-finished container 4, 4'. Furthermore, said inclined position could correspond to an inclination I of angle θ that is positive or negative in a plane P' (not shown) that is orthogonal to said plane P shown in the figures, or indeed could correspond to a combination of an inclination $I_P$ of angle $θ_P$, in said plane P and an inclination $I_{P'}$ of angle $θ_{P'}$ in a plane P' (not shown) orthogonal to the plane P.

Consequently, there exist an infinity of potential inclined positions, depending firstly on the general shape specific to the shell 5, 5' of the semi-finished container 4, 4' obtained at the end of the forming step, and secondly on the particular shape that is desired to impart to the inside face 7, 7' of the semi-finished container 4, 4'.

Preferably, said advantageously predefined inclined position is a static position of said semi-finished container 4, 4', i.e. said inclined position corresponds to an inclination I that is maintained constant throughout said predetermined time t at a given angle θ for said semi-finished container 4, 4' relative to said upright vertical position. Alternatively, said inclined position need not correspond to a single inclination I that is constant. Specifically, it could on the contrary be "dynamic", and correspond to a predefined sequence of a plurality of distinct inclinations $I_n$ at given angles $θ_n$, that are maintained respectively during predetermined times $t_n$ (such that the sum of said predetermined times $t_n$ is equal to said predetermined time t). It can thus be possible to control in particularly detailed manner the movement d of the glass forming the inside face 7, 7' of the semi-finished container 4, 4' and to obtain particularly original and pleasing shapes for said inside face 7, 7' by controlled non-uniform distribution of the glass. Specifically, a "non-linear" phenomenon is observed in the movement d of the glass under the effect of gravity, said glass beginning its movement very slowly in a manner that is almost imperceptible to the naked eye, prior to moving at faster and increasing speed, and then slowing down.

Although it is possible to envisage that said shaping operation of the inside face 7, 7' of the semi-finished container 4, 4' takes place while the container is still in position in the finish mold, said method of the invention preferably includes, prior to said shaping operation, a step of extracting the semi-finished container 4, 4' from the finish mold. In other words, the operation of shaping the inside face 7, 7' of the semi-finished container 4, 4' is preferably performed after the end of said forming step and once the semi-finished container 4, 4' has been extracted from said finish mold. It should be observed that in the above-mentioned situation in which the semi-finished container 4, 4' is obtained by a "pure press" method, i.e. solely by pressing said mass of molten glass in a paraison mold during said forming step, said extraction step may correspond to extracting the semi-finished container 4, 4' from said paraison mold.

At the end of the forming step, and preferably during said step of extracting the semi-finished container 4, 4' from the finish mold, grip (or gripper) means, e.g. of the tongs or cage type, are advantageously used to take hold of the semi-finished container 4, 4' via its outside face 8, 8', more preferably via its neck 11, 11' and its side wall 10, 10'.

Preferably, said semi-finished container 4, 4' is placed during said cooling step in a stream of ventilation air so as to contribute and possibly accelerate its cooling. For this purpose, said grip means may place said semi-finished container 4, 4' over and facing a horizontal rest plate that is pierced by orifices through which there is passed an upward vertical stream of ventilation air (advantageously air that is dry and substantially dust-free), for the purpose of contributing to cooling said semi-finished container 4, 4'. This air stream is preferably at ambient temperature, with the cooling speed of the semi-finished container 4, 4' then advantageously being controlled by fine adjustment of the flow rate of said air stream. In particular, great care should be taken to avoid using a flow of air that is excessive, that might cause the semi-finished container 4, 4' to be moved from said inclined position, and that might indeed oppose any effect of gravity on the glass forming said inside face 7, 7' of said semi-finished container 4, 4'.

Preferably, the shaping operation itself then begins when the semi-finished container 4, 4' is in said transient state, with support means holding said semi-finished container 4, 4' in said predefined inclined position, preferably in a manner that is firm and stable. Advantageously, the support means may be the same as said grip means and the semi-finished container 4, 4' is then held thereby in said inclined position via its outside face 8, 8' and preferably via its neck 11, 11' and its side wall 10, 10'.

During iterative test campaigns undertaken by the Applicant, it has been found that it is particularly advantageous for said step of shaping the inside face 7, 7' to be initiated while the transient state in which the semi-finished container 4, 4' is to be found corresponds to the presence of a large viscosity (and thus temperature) gradient, typically of the order of 300° C. (or more), between said inside and outside faces 7, 7' and 8, 8'. Specifically, the existence of a large viscosity and/or temperature gradient between said inside and outside faces 7, 7' and 8, 8' serves to facilitate the movement d of the glass forming said inside face 7, 7' under the effect of gravity, i.e. under the effect of its own weight, in particular in the absence of any additional force being applied to assist said effect of gravity. Naturally, the order of magnitude of this temperature gradient could be adjusted, firstly depending on the nature of the glass used, and secondly depending on the mean thickness of the side wall 10, 10' and/or of the bottom wall 9, 9' forming the shell 5, 5' of said semi-finished container 4, 4'.

By way of example, said semi-finished container 4, 4' may thus be extracted from said finish mold (or from said paraison mold, where appropriate), while it is in said transient state, and the temperature Te of its outside face 8, 8' is advantageously equal to 600° C., and the temperature Ti of its inside face 7, 7' is advantageously substantially equal to 900° C.

Insofar as said semi-finished container 4, 4' at the end of said forming step or of said extraction step is not already in said predefined inclined position, but for example in a position corresponding substantially to its upright vertical position, as defined above, the method of the invention may advantageously make use of tilt means designed to cause said semi-finished container 4, 4' to change its orientation so as to bring it into said inclined position. Thus, once said grip means have preferably taken hold of the semi-finished container 4, 4' via its outside face 8, 8', said tilt means advantageously causes said semi-finished container 4, 4' to be subjected to a change of orientation, i.e. to an inclination I of angle θ as described above, so as to bring the semi-finished container 4, 4' into said inclined position before said support means hold the semi-finished container 4, 4' in said inclined position during said predetermined time t.

Advantageously, and as described below, the tilt means may be incorporated in said grip means and/or in said support means.

Determining the predetermined time t during which said semi-finished container 4, 4' is kept in said inclined position relative to said upright vertical position may depend on the nature of the glass used, on the dimensions of the semi-finished container 4, 4', on the viscosity of the glass forming said inside face 7, 7' at the beginning of said shaping step, and thus on its propensity to move more or less quickly under the effect of gravity, on the mean rate of cooling of said semi-finished container 4, 4', in particular under the effect of said ventilation air stream, or indeed on the shape that it is desired actually to impart to said inside face 7, 7' (e.g. a more or less pronounced shift of the bottom 9, or indeed a smaller or larger radius of curvature for the bottom 9' of the semi-finished container 4, 4'). Said predetermined time t may also correspond strictly to the time needed by said semi-finished container 4, 4' to leave said transient state (or indeed to exceed this time needed), i.e. to the time needed for the glass forming the inside face 7, 7' of said semi-finished container 4, 4' to become sufficiently viscous to ensure that said inside face 7, 7' no longer deforms perceptibly under the effect of gravity, and at any rate not in a manner that is observable to the naked eye. Nevertheless, for reasons in particular of productivity, said predetermined time t may be optimized and may advantageously be selected to be shorter than the time needed for said semi-finished container 4, 4' to leave said transient state. In preferred manner, when the method of the invention is performed automatically using an IS machine, said predetermined time t may correspond to a range of about 200° of a cycle to 360° of a cycle of said IS machine, and may for example be substantially equal to 5 seconds (s).

Once the predetermined time t has elapsed, the semi-finished container 4, 4' is preferably returned from said inclined position in which it was being held to said upright vertical position, advantageously by a new change of orientation performed by said tilt means. Thereafter, said grip means advantageously then place the semi-finished container 4, 4' in said upright vertical position on said rest plate before it is removed, e.g. using a conveyor belt.

Finally, the method of the invention may advantageously include an annealing step (e.g. in a lehr) at the end of said shaping operation, during which said semi-finished container 4, 4' is advantageously annealed so as to eliminate any residual tensions therefrom (in particular in thick zones of the glass).

The invention also relates to an installation as such (not shown) for fabricating a glass container 1, 1' from a mass of molten glass that is advantageously designed to perform the above-described method of the invention. Said installation is preferably an automatic industrial installation that advantageously makes use of production means that are mechanized and automatic. In the invention, the installation comprises a station (preferably a station that is automatic of the IS machine type and not manual or not semiautomatic only) for forming said mass of molten glass in order to obtain a semi-finished container 4, 4', said mass of molten glass and said semi-finished container 4, 4' advantageously being in accordance with the above detailed description.

Preferably, said forming station comprises a final blowing system with a finish mold designed to enable said semi-finished container 4, 4' to be obtained by blowing a glass blank in said finish mold, the blank itself being obtained from said mass of molten glass. Also preferably, said forming station also includes, upstream from said final blowing system, a preforming system that includes a paraison mold, which preforming system is designed to enable said blank to be obtained by subjecting said mass of molten glass to pressing ("press and blow" method) or by blowing ("blow-blow" method) in said paraison mold. Alternatively, said forming station could have only one pressing system ("pure press" method) for pressing said mass of molten glass, and designed to enable a blank to be obtained that directly constitutes said semi-finished container 4, 4', in particular without any additional blowing operation. Such final blow and/or press systems, preforming system, and associated molds are themselves well known in the field of the glass-making industry and they are therefore not described in greater detail herein.

In the invention, said installation also comprises means cooling the semi-finished container 4, 4'. Advantageously, these cooling means comprise, in addition to ambient air serving to allow said semi-finished container 4, 4' to cool naturally, a horizontal rest plate that is pierced by through orifices and that is associated with a system for generating an air stream designed to enable an upward vertical ventilation air stream to be passed through said orifices in the rest plate. Said cooling means may also advantageously include other elements and devices, possibly constituting parts of said forming station.

In particular, said cooling means advantageously include said finish mold, given that, since said finish mold does not have sufficient means for heating and/or maintaining temperature, it contributes, as mentioned above, to cooling the semi-finished container 4, 4' merely by contact between the inside wall of the finish mold and the outside face 8, 8' of the semi-finished container 4, 4'.

In the invention, said cooling means are designed more specifically to enable said semi-finished container 4, 4' to be taken to (or indeed to be maintained in) a transient state advantageously in accordance with the above description given with reference to the method of the invention. For this purpose, said installation may advantageously include specifically a device for controlling and regulating said cooling means. By way of example and in non-limiting manner, that device may include sensors (e.g. optical sensors) and regulator means for regulating the temperature of the inside wall of the finish mold and/or the temperatures Te and Ti of said outside and inside faces 8, 8' and 7, 7' of the semi-finished container 4, 4', together with tools (of flow meter or other type) for measuring the flow rate of the ventilation air stream and for regulating it (valve, etc.).

In the invention, said installation further comprises means for shaping (i.e. advantageously for "remodeling") the inside face 7, 7' of said semi-finished container 4, 4' that are designed to maintain said semi-finished container 4, 4' in a position that is inclined relative to its upright vertical position for a predetermined time t, in order to cause the shape of said inside face 7, 7' to be modified by the glass moving d under the effect of gravity while the semi-finished container 4, 4' is in said transient state. Said predetermined time t, said inclined position, and also said upright vertical position, are advantageously in accordance with the above description given with reference to the method of the invention.

In preferred manner, said shaping means include grip (or gripper) means for gripping said semi-finished container 4, 4' via its outside face 8, 8'. As mentioned above with reference to the method of the invention, the grip means may be in the form of a system of tongs (e.g. having two, three, or four arms) or a "cage" formed by half-cages that are preferably designed to be capable of taking hold of the semi-finished container 4, 4' via its outside face 8, 8', more preferably via its neck 11, 11' and its side wall 10, 10'.

Preferably, said installation includes extractor means (or "unmolder" means) for extracting the semi-finished container 4, 4' from the finish mold after it has been opened, which extractor means may then advantageously coincide with said grip means. For example, said grip means may be mounted on a transfer arm and may also preferably be designed to position the semi-finished container 4, 4' over and facing the horizontal rest plate of said cooling system once the container has been extracted from the finish mold.

Said shaper means preferably comprise support means designed to maintain the semi-finished container 4, 4' in said inclined position, preferably in firm and stable manner. By way of example, the support means may be in the form of a suspension bracket or a plate mounted on a frame in a manner that is inclined relative to the horizontal and on which said semi-finished container 4, 4' comes to rest. Nevertheless, said support means preferably coincide with said grip means, which are thus advantageously designed both to take hold of the semi-finished container 4, 4' obtained from the forming station and then to maintain it in a particular orientation in three dimensions corresponding to said predefined inclined position, for a predetermined time t.

Insofar as said semi-finished container 4, 4' is not already in said predefined inclined position in the forming station and in particular in the finish mold, the shaper means of the installation of the invention may advantageously include an inclination system or means designed to cause said semi-finished container 4, 4' to change its orientation so as to bring it into said inclined position. Thus, once said grip means have preferably taken hold of the semi-finished container 4, 4' via its outside face 8, 8', the inclination means can advantageously cause said semi-finished container 4, 4' to change its orientation in three dimensions, i.e. give it an inclination I of angle θ as described above, so as to bring the semi-finished container 4, 4' into said inclined position prior to said support means maintaining the semi-finished container 4, 4' in said inclined position for said predetermined time t.

Advantageously, said inclination means are also designed to cause said semi-finished container 4, 4' to change orientation once more after the predetermined time t has elapsed so as to bring the semi-finished container 4, 4' from said inclined position to its upright vertical position.

Said inclination means may advantageously be included in said grip means, e.g. in the form of an electrical, pneumatic, or hydraulic mechanical system (stepper motor, actuator, etc.) for causing said grip means to turn, or indeed they may be included in said support means, e.g. in the form of an electrical, pneumatic, or hydraulic mechanical system (stepper motor, actuator, etc.) for modifying the attitude of said support means relative to the horizontal. Nevertheless, in particularly advantageous manner, said extractor means, grip means, inclination means, and support means substantially coincide, being grouped together so as to form a single mechanical subassembly that is advantageously robotically controlled, and that is in the form of a movable arm having a single- or multi-axis rotary grip system at its free end. The design of said shaper means can thus be significantly simplified, and they can be particularly effective and relatively compact.

Advantageously, the installation of the invention may also include an automatic device for monitoring and controlling said shaper means, advantageously servo-controlled by the above-mentioned device for controlling and regulating said cooling means, in which said inclined position (and in particular said inclination I of angle θ) and also said predetermined time t advantageously constitute adjustable input parameters. This makes it possible to guarantee great reliability and repeatability of the method of the invention.

In still more preferred manner, said device for automatically monitoring and controlling the shaper means and said control and regulator device of said cooling means are themselves put into a servo-control relationship with said forming station, such that the installation of the invention constitutes in most advantageous manner a fabrication installation that is totally automatic (ignoring any maintenance operations) for fabricating glass containers 1, 1'.

Said installation preferably also includes an annealing lehr positioned downstream from said shaper means and designed to subject said semi-finished container 4, 4' to a step of annealing and relaxing any residual tensions (in particular in zones of thick glass).

As can be seen from the above, the installation of the invention is thus of particularly simple and inexpensive design. It is also particularly easy to implement and makes it possible using the method of the invention to fabricate glass containers 1, 1' that are provided with a particularly pleasing internal distribution of glass, and to do so at a rate that is particularly high, and compatible with the requirements for production on an industrial scale.

The invention claimed is:

1. A method of fabricating a glass container (1, 1') from a mass of molten glass, the method comprising:
    forming said mass of molten glass in order to obtain a semi-finished container (4, 4') comprising a glass shell (5, 5') that defines an inside cavity (6, 6') and that presents an inside face (7, 7') placed facing said inside cavity (6, 6') and an opposite, outside face (8, 8');
    cooling the semi-finished container (4, 4'), during which said semi-finished container (4, 4') is taken to a transient state in which glass forming said outside face (8, 8') is sufficiently viscous for said outside face (8, 8') not to deform under the effect of gravity, while glass forming said inside face (7, 7') is still sufficiently fluid to be capable, on the contrary, of allowing said inside face (7, 7') to deform under the effect of gravity and move relative to the glass of said outside face; and
    shaping said inside face (7, 7') while the semi-finished container (4, 4') is in said transient state, during which the semi-finished container (4, 4') is maintained for a predetermined time in an inclined position that is inclined relative to its upright vertical position in order to cause the shape of said inside face (7, 7') to be modified by movement (d) of the glass under the effect of gravity.

2. A method according to claim 1, in which, in said transient state, the viscosity of the glass forming said outside face (8, 8') is greater than $10^{7.6}$ dPa·s, while the viscosity of the glass forming said inside face (7, 7') is less than or equal to $10^{7.6}$ dPa·s.

3. A method according to claim 1, in which, in said transient state:
    the temperature Te of said outside face (8, 8') lies substantially in the range 550° C. to 650° C.; and
    the temperature Ti of said inside face (7, 7') lies substantially in the range 750° C. to 1200° C.

4. A method according to claim 1, in which, during said shaping said inside face (7, 7'), the shape of said inside face (7, 7') by movement (d) of the glass is modified solely under the effect of gravity.

5. A method according to claim 1, in which said inclined position corresponds to an inclination (I) of the semi-finished container (4, 4') at 90° relative to said upright vertical position.

6. A method according to claim 1, in which said inclined position corresponds to an inclination (I) of the semi-finished container (4, 4') at 180° relative to said upright vertical position.

7. A method according to claim 1, in which said inclined position is a static position of said semi-finished container (4, 4').

8. A method according to claim 1, in which said forming comprises a final blowing operation in which a glass blank obtained from said mass of molten glass is blown in a finish mold.

9. A method according to claim 8, in which said final blowing operation is preceded by a preforming operation for obtaining said blank by pressing or blowing said mass of molten glass in a parison mold.

10. A method according to claim 8, in which, prior to said shaping said inside face (7, 7'), the method includes extracting the semi-finished container (4, 4') from the finish mold.

11. A method according to claim 1, in which, during said cooling, said semi-finished container (4, 4') is placed in a stream of ventilation air.

12. A method according to claim 1, in which, at the end of the forming, grip means take hold of the semi-finished container (4, 4') via said outside face (8, 8'), and then support means maintain said semi-finished container (4, 4') in said inclined position.

13. A method according to claim 12, in which, once said grip means have taken hold of the semi-finished container (4, 4') via said outside face (8, 8'), tilt means cause said semi-finished container (4, 4') to change its orientation so as to bring it into said inclined position, prior to said support means maintaining said semi-finished container in said inclined position.

14. A method according to claim 1, in which said method is fully automatic.

\* \* \* \* \*